United States Patent Office 3,461,179
Patented Aug. 12, 1969

3,461,179
METHOD OF PREVENTING THE FORMATION OF POPCORN POLYMER OF CHLOROPRENE
Akio Oshima, Kobe, Shinichi Sakurai, Takasago, and Tetsuo Matsuo, Kobe, Japan, assignors to Kanegafuchi Chemical Industry Co., Ltd., Osaka, Japan, a corporation of Japan
No Drawing. Filed July 6, 1967, Ser. No. 651,385
Claims priority, application Japan, Sept. 7, 1966, 41/53,980
Int. Cl. C07c 17/42, 101/12, 21/20
U.S. Cl. 260—652.5    5 Claims

ABSTRACT OF THE DISCLOSURE

Method of preventing the formation of popcorn polymer of chloroprene by adding to chloroprene monomer, a compound having the formula

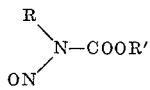

where R, R' represent alkyl radicals, and retaining the mixture in a nitrogen atmosphere.

---

This invention relates to method of preventing the formation of popcorn polymer of chloroprene.

Chloroprene monomer is known to form popcorn polymer during its storage or during its manufacture, especially during distillation. Popcorn polymer is an opaque granular solid, which once formed grows rapidly and eventually consumes the chloroprene monomer. As a result, the forming and storage apparatus would become clogged by the popcorn polymer. Since, popcorn polymer does not dissolve in any known solvent, it is desirable to prevent their formation.

An object of this invention is to eliminate the above defect.

According to this invention, compounds represented by the formula

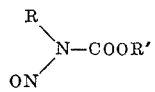

where R and R' represent alkyl radicals, are added to or contacted with chloroprene monomer to inhibit the formation of popcorn polymer. Examples of these compounds are N-nitroso methyl urethane, N-nitroso ethyl urethane, etc.

These compounds may be used singly or in combination with each other. Since they are soluble in chloroprene monomer, they are kept at uniform concentrations in the monomer. Since the amounts of these compounds would differ according to the temperature of the system, the time of operation, etc, the amounts are not specified in general terms. The purpose of their use may be attained by using amounts of more than 100 p.p.m. by weight of the chloroprene monomer.

There is practically no limitation on the use of these compounds. For example, it is only necessary to add and dissolve their proper amounts in the chloroprene monomer to keep them in storage. In distillation, the chloroprene solution of the aforementioned inhibitor may be continuously added from the top of the column. The amounts added may be, for example, 100 to 300 p.p.m. by weight of the monomer existing in the distilling column. The inhibitor added may be discharged from the bottom of the column. From the top of the column, the chloroprene which is of high purity may be distilled out. During this period of time, formation of popcorn polymer was not recognized.

Example 1

To 1000 parts by weight of chloroprene monomer, there was added 0.3 part by weight of N-nitroso methyl urethane, 2 parts by weight of phenothiazine, and 0.05 g. of seeds of popcorn polymer. This mixture was sealed in a glass ampule under a nitrogen atmosphere. The ampule was put in a thermostat maintained at a temperature of about 40° C. No growth of the seeds was observed, even after a period of two months.

In contrast to this, when the experiment was conducted by the same method and under the same condition as mentioned above, but without addition of N-nitroso methyl urethane, the growth of popcorn seeds was observed within a period of several days.

Example 2

The experiment was conducted by the same method and conditions as those in Example 1, except that N-nitroso ethyl urethane was used in place of N-nitroso methyl urethane. No growth of the popcorn seeds was observed, even after a period of two months.

What is claimed is:
1. Method of preventing formation of popcorn polymer of chloroprene, comprising the steps of adding to or contacting with a chloroprene monomer, at least 100 p.p.m. by weight of a compound having the formula

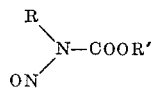

wherein R, R' represent alkyl radicals, and maintaining the resulting mixture in a nitrogen atmosphere.

2. The method of claim 1, wherein said compound comprises from 100 to 300 p.p.m. by weight of said chloroprene monomer.

3. Method of preventing formation of popcorn polymer of chloroprene, comprising the steps of adding to 1000 parts by weight of chloroprene monomer, at least 0.1 part by weight of compound having the formula

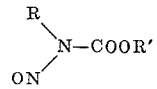

where R, R' represent alkyl radicals, adding about 2 parts by weight of an inhibitor, and sealing the resulting mixture in a chamber filled with nitrogen at atmospheric pressure and maintained at about 40° C.

4. The method of claim 3, wherein 0.3 parts by weight of N-nitroso methyl urethane is used as said compound.

5. The method of claim 4, wherein said compound is N-nitroso ethyl urethane.

References Cited

UNITED STATES PATENTS
3,042,726   7/1962   Cook _____ 260—652.5

FOREIGN PATENTS
789,702   1/1958   Great Britain.
1,008,819   11/1965   Great Britain.

BERNARD HELFIN, Primary Examiner
MATTHEW M. JACOB, Assistant Examiner

U.S. Cl. X.R.
53—6